United States Patent [19]
Levitan

[11] Patent Number: 5,534,911
[45] Date of Patent: Jul. 9, 1996

[54] VIRTUAL PERSONAL CHANNEL IN A TELEVISION SYSTEM

[76] Inventor: Gutman Levitan, 101 Grove St., Stamford, Conn. 06901

[21] Appl. No.: 333,376

[22] Filed: Nov. 2, 1994

[51] Int. Cl.⁶ ........................................ H04N 7/03
[52] U.S. Cl. ................ 348/1; 348/2; 348/6; 348/10
[58] Field of Search ................................ 348/1, 2, 5, 6, 348/12, 13, 906, 10; 455/2, 5.1

[56] References Cited

U.S. PATENT DOCUMENTS

| | | | |
|---|---|---|---|
| 5,047,867 | 9/1991 | Strubbe | 358/355 |
| 5,075,771 | 12/1991 | Hashimoto | 358/84 |
| 5,223,924 | 6/1993 | Strubbe | 358/86 |
| 5,410,344 | 4/1995 | Graves et al. | 348/1 |
| 5,444,499 | 8/1995 | Saitoh | 348/906 |

*Primary Examiner*—Victor R. Kostak
*Attorney, Agent, or Firm*—Ilya Zborovsky

[57] ABSTRACT

An apparatus for providing a customer of a television system with virtual personal channel which being selected delivers a television program of the most personal interest no matter on which channel and at what time the program is physically transmitted. Descriptive and time/channel data of scheduled TV programs are broadcasted through a communication medium from the system headend to customer terminal prior to transmission of programs themselves. In customer terminal all scheduled TV programs are evaluated by a computer that stores customer profile data and controls customer video receiver and video recorder. Whenever customer selects personal channel the computer switches the video receiver to a physical channel on which a program having the best evaluation is transmitted. The best program of the day or the week is recorded and can also be presented as current program of personal channel.

2 Claims, 5 Drawing Sheets

```
PERSONAL PROGRAMMING
      MAIN OPTIONS

1. PERSONAL GUIDE
2. CHANNEL CONTROL
3. AUTO RECORDING
4. PERSONAL CHANNEL
5. PROFILE DEVELOPEMENT
?. EXPLANATION
```

PERSONAL PROGRAMMING
MAIN OPTIONS

1. PERSONAL GUIDE
2. CHANNEL CONTROL
3. AUTO RECORDING
4. PERSONAL CHANNEL
5. PROFILE DEVELOPEMENT
?. EXPLANATION

*FIG.3*

PERSONAL CHANNEL

1. TENNIS: Los Angeles Open. Live. 7PM CH 41.
2. FILM: Coneheads. 8PM CH 49.
3. FILM: Bodygard. VCR.
4. FILM: Tombtone. PAY PER VIEW. 8PM CH 43.

Press number of choice for information on the chosen program.

Press * to start automatic personal channel mode.

The choice number 1 is fulfilled in automatic mode.
To replace it, press # and number of other choice.

Press ? for explanation.

Press 0 to return to main pannel.

VIRTUAL PERSONAL CHANNEL IN A TELEVISION SYSTEM

BACKGROUND OF THE INVENTION

The present invention relates to multichannel television systems, which are typically cable TV networks, and addresses the problem of utilizing their new channel capacity. It is evident that browsing TV channels and reading a guide magazine become inefficient with 800 or so channels and in order to efficiently utilize the new capacity a new medium is required. This invention presents such a medium, an automated personal programming system that incorporates TV set, VCR and computer to provide each customer with a virtual personal channel that delivers programs of the most personal interest at the most convenient time.

At the network headend the medium is supported by a data processing and transmitting system that stores descriptive and time-channel data on scheduled TV programs, and transmits the data through the network prior to the programs. At the customer end the preview data is processed by a computer that is a part of customer terminal. The computer stores a customer profile data representing customer iterests and preferences. It evaluates each program to be transmitted in respect to the customer profile, makes a choice and if the terminal is switched to an automatic mode, provides a real time control of channel selector, TV set and VCR to deliver a selected program to the customer.

The automated personal programming can be used for both conventional one-way TV services and new two-way or interactive services such as pay per view, video on demand and teleshopping. The system passes time and stress of choice to computer and what is even more important, it is able to read and analyze much more information on available programs, products and services and as a result to make a better choice individually providing each customer with the most enjoyable entertainment and the most relevant information while protecting from everything which is going to be boring, anoying, useless or unacceptable for any reason.

SUMMARY OF THE INVENTION

Accordingly, it is an object of the present invention to provide cable TV subscribers with automated channel control service implemented by means of transmitting data on scheduled TV programs prior to the programs and processing the data in a computerized customer terminal that selects programs evaluating their descriptive data in respect to a customer profile and uses time and channel data to switch the channel selector to a proper channel at a proper time in order to keep the video receiver set for reception of selected programs.

Another object is a similar system for automated recording. The system compares transmitted descriptive preview data with customer profile data to make a best choice among programs to be transmited on all available channels 24 hours a day, seven days a week. Then it uses time and channel data of selected program to switch the channel selector to the specified channel, turn on VCR and set it into recording mode in the beginning of the program, and stop recording, rewind the tape and turn off power at the end of the program.

A further object of the invention is a compressed personal guide system which selects and presents information on scheduled programs of the most interest for the customer. At the network headend the service is supported by a multimedia system that stores and-transmits formatted data intended for computer analysis along with unformatted information, such as text, sound, still and moving picture intended for customer attention. At the customer end, the formatted data is evaluated in respect to the customer profile to make first, second, third and so on choices. Then activated by a customer request the system uses TV set as a computer video monitor to present multimedia information on chosen programs.

The compressed personal guide combined with the automatic channel selection or the automatic recording facilitates customer control in the automated environment supplying customer with information on chosen programs and providing means to replace the first, intended for fulfillment choice by one of other choices. The combination of the guide, the automatic channel selection, and the automatic recording, implements a virtual personal channel system which, when activated, keeps customer terminal permanently set for delivering the best program selected from a plurality of currently transmitted and previously recorded programs.

BRIEF DESCRIPTION OF THE DRAWING FIGURES

FIG. 3 shows the main pannel of automated programming system on TV screen;

FIG. 4 shows an example of personal channel pannel;

DETAILED DESCRIPTION OF THE PREFERED EMBODIMENTS

Figure 1:
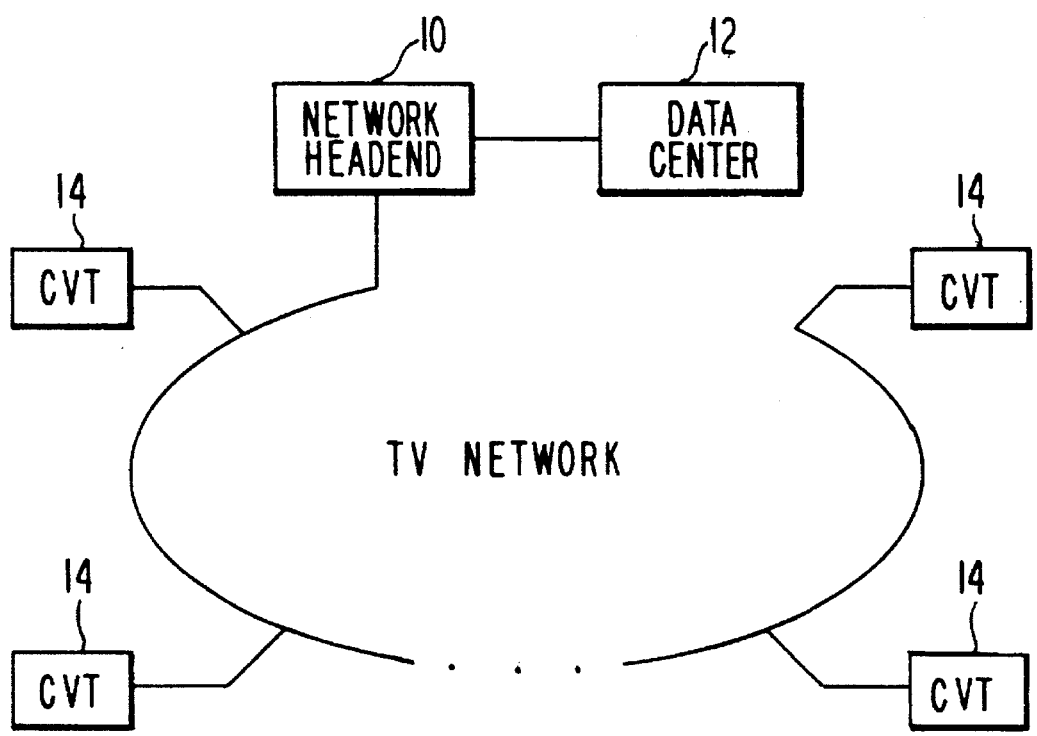
FIG. 1 is a block diagram of a TV network with automated personal programming.

The automated personal programming can be implemented in any multichannel TV system and it is really not important how many channels the system exploits because only one and may be not full time additional channel is required for preview data transmission. The system central part or headend 10 is connected to a data processing center 12 where information on TV programs and services such as movies, shows, news is stored in a multimedia database (FIG. 1). The information includes both formatted data intended for computer analysis and unformatted presentations intended for customer attention. The presentations comprise text, voice, still picture and short fragments of TV programs. The formatted data is organized in a special way so that it could be processed by a computer program in a computerized video terminals (CVT) 14 connected to the network at the customer end.

When a TV program is scheduled for transmission its descriptive information is retrieved from the database, suplemented with data on transmission time and channel and transmitted through the network prior to the program. In customer terminals the preview data of each program is evaluated in respect to customer profile and as a result, each terminal makes its own choice before the scheduled TV programs are transmitted. The customer profile is developed in an interactive session, which will be described hereinafter, and privately stored in the personal system thus inaccessible from any other point of the network including headend.

Figure 2:
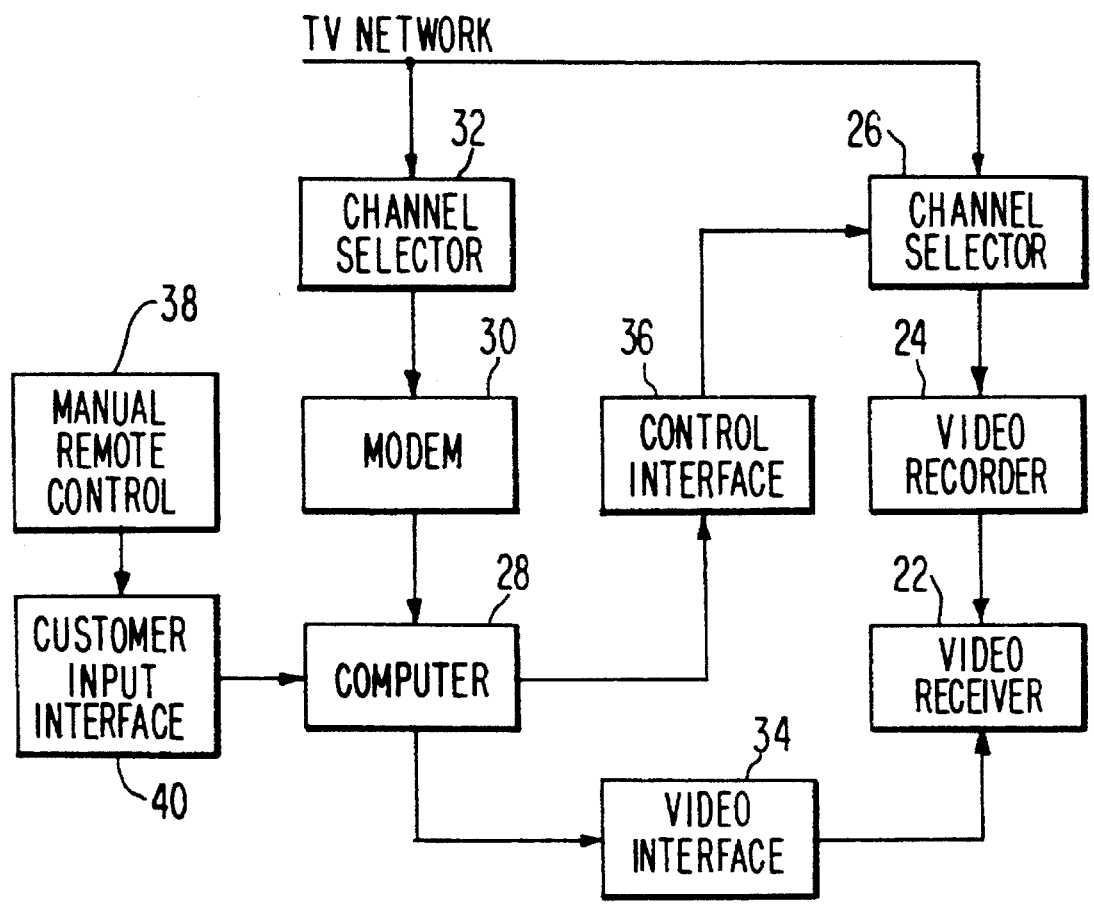
FIG. 2 is a block diagram of a computerized video terminal providing compressed personal guide, automatic channel selection and automatic recording.

FIG. 2 shows a block diagram of a computerized video terminal. It includes a conventional video receiver (TV set) 22 and a conventional video recorder (VCR) 24 connected to the network through a conventional channel selector (cable box) 26. A computer 28 is connected to the network through a modem 30 and a channel selector 32 set to a channel used in the network for previewing data transmission. To output signals representing multimedia information the computer is connected to the video receiver through a video interface 34, a device widely used in video game technology. This connection is implemented using the antenna input of the video receiver or the video signal input, if available, and therefore does not require any change to existing TV sets.

A control interface device 36 converts the computer output signals into remote control signals directed to the channel selector and the video recorder. While every video receiver has its own channel selector, it may be connected to the network through the channel selector of a video recorder or a cable box. All those channel selectors have remote control circuits and whether a customer video terminal consists of a TV set alone or a TV set coupled with a VCR and/or a cable box, the computer can switch channels with the control interface 36 without any wiring and any change to existing TV sets, VCRs and cable boxes. The same is true for VCR control: the remote control 36 handled by computer turns power on and off, starts and stops recording, rewinds and plays the tape in the same way as a conventional manual remote control does. Therefore in such an implementation the additional equipment necessary for personal programming is autonomous and compatible with existing TV sets, VCRs and cable boxes. The equipment can be added to existing home entertainment centers to provide subscribers with automated channel control, automated recording and compressed personal guide.

Customer input to the system is provided through a manual remote control device 38 similar to those of TV set, VCR and cable box, and an interface device 40 that converts infrared signals of the remote control into signals processed by the computer. When a button ON is pressed on the remote control, the video receiver 22, the video recorder 24 and the channel selector 26 are set under computer control while pressing a button OFF returns the video terminal to its conventional mode. Under computer control the video receiver shows the main pannel of the personal programming system (FIG. 3). If customer selects personal channel option (pressing the button 4 on the remote control) he or she will see a personal channel pannel (FIG. 4) that shows first, second and so on choices made by computer in respect to the customer profile. Now pressing * invokes automatic personal channel mode in wich a TV program of the first choice will be on the screen. However, as the pannel explains, before starting the mode the customer can get information on the choices presented and replace the first choice by other one. The multimedia information combines text, voice, still picture and short fragments of the chosen TV programs—like any conventional preview presentation. The difference is that the presentation is individually selected for each customer, stored in computer and presented on request.

The personal channel option, when invoked, keeps the whole video terminal set for presenting a best program selected from a plurality of currently transmitted and previously recorded programs. The channel control (option 2 on main pannel) does the same but ignores VCR while auto recording (option 3) is dedicated to VCR control only. The auto recording pannel shows what has been chosen for recording among programs to be transmitted during the week, explains how to get information on chosen programs and replace a program of the first choice by one of other choices.

Personal guide (option 1) pannel looks like one on FIG. 4 however it presents not only choices made on currently transmitted and previously recorded programs but also on future programming. Customer can browse his personal guide, get short and extended information on selected programs and make correction changing choices intended for fulfillment. All pannels are provided with a help facility: pressing ? on manual remote control brings explanation what is the pannel for and what different options on the pannel exactly mean.

Figure 5:
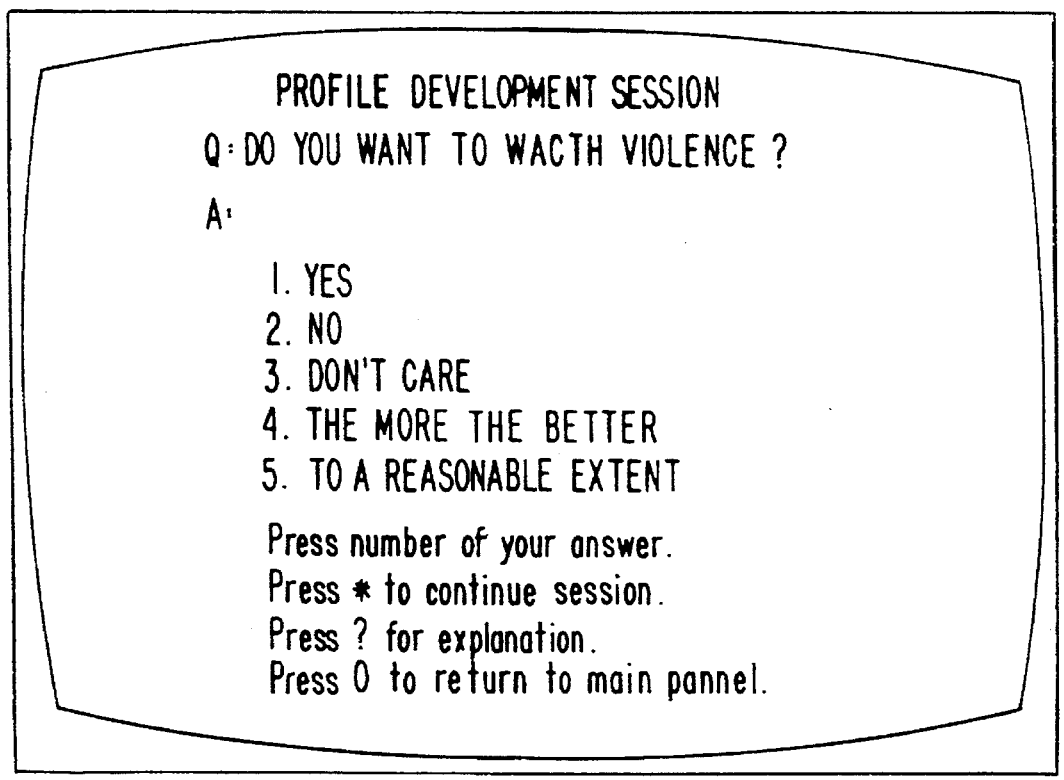
FIG. 5 shows an example of pannel in profile development session.

The personal programming system does not work without customer profile. Therefore the first thing to be done after the system installation is selection of the option 5 from the main menu (FIG. 3) to start a profile development session. During the session the computer presents a sequence of questions and multiple choice of numbered answers like those on FIG. 5. Pressing a number of his choice on the manual remote control the customer provides computer with information that will be used for evaluation of TV programs. If customer is uncertain about a question and/or how a particular answer will be used in the evaluation process he can press ? to get explanation. The other option is to skip the question. Once selected answer will be highlighted on the screen for future profile correction which can be made at any time. There are two types of questions in the session: direct that target particular aspects of TV programs such as violence and adult language, and indirect that collect personal data such as age, education, ethnic origin and zip code in order to use results of demographic research in the profile development. To make the session shorter and to adjust it to customer, following questions may differ depending on previous customer responses.

While certain novel features of this invention have been shown and described and are pointed out in the annexed claims, it will be understood that various omissions, substitutions and changes in the forms and details of the devices illustrated and their operation can be made by those skilled in the art without departing from the spirit of the invention.

I claim:

1. An apparatus for providing a customer of a television system, in addition to regular television channels, with virtual personal channel which being selected for a customer television receiver delivers a television program of the most personal interest automatically chosen among programs concurrently transmitted on all available physical channels of the system, said apparatus comprising:

communication means at a television system headend for broadcasting descriptive and time/channel data of scheduled television programs prior to transmission of the programs, said descriptive and time/channel data formatted for computer analysis;

means at customer end for receiving said descriptive and time/channel data formatted for computer analysis;

means at customer end for storing customer profile data representing customer interests and preferences;

program evaluation means at customer end coupled to said receiving means and to said storing means for processing said formatted descriptive data of scheduled television programs and providing evaluations of the television programs in respect to said customer profile data; and real-time control means at customer end coupled to said program evaluation means and to said customer television receiver for determining in correspondence with said television program evaluations and said television program time/channel data which of the programs currently scheduled for transmission has the best evaluation and, only when personal channel is selected by the customer, switching the customer television receiver to the channel of the television system on which the program having the best evaluation is scheduled for transmission.

2. An apparatus as claimed in claim 1 and further comprising a video recording means coupled to said real-time control means, said real-time control means determining which of the television programs scheduled for transmission during a specified period of time has the best evaluation, providing automatic recording of the program at the time when the program is transmitted and providing automatic reproducing of the recorded program as the program of personal channel when personal channel is selected and the evaluation of the recorded program is better than evaluation of any program currently scheduled for transmission.

* * * * *